F. L. RAPSON.
MEANS FOR STEERING MOTOR VEHICLES.
APPLICATION FILED OCT. 16, 1918.
1,343,846.
Patented June 15, 1920.
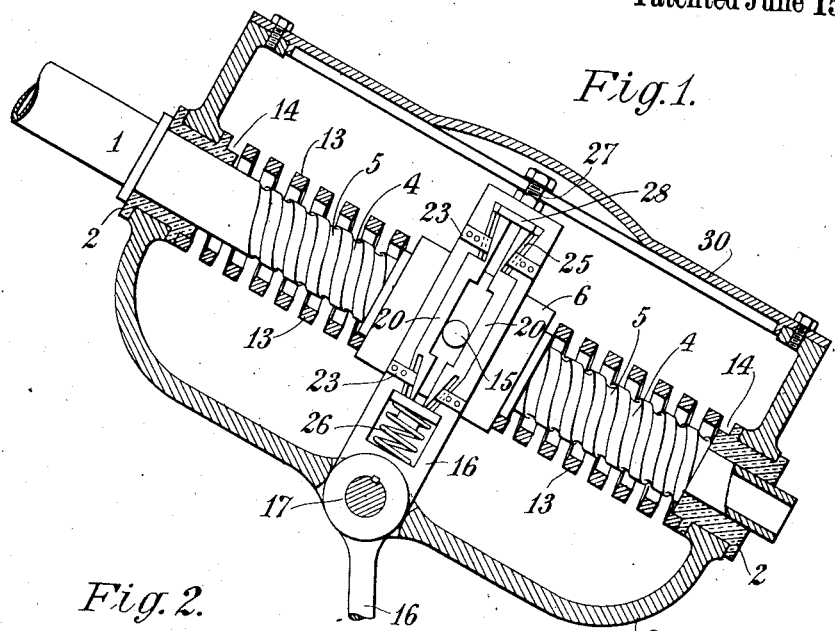
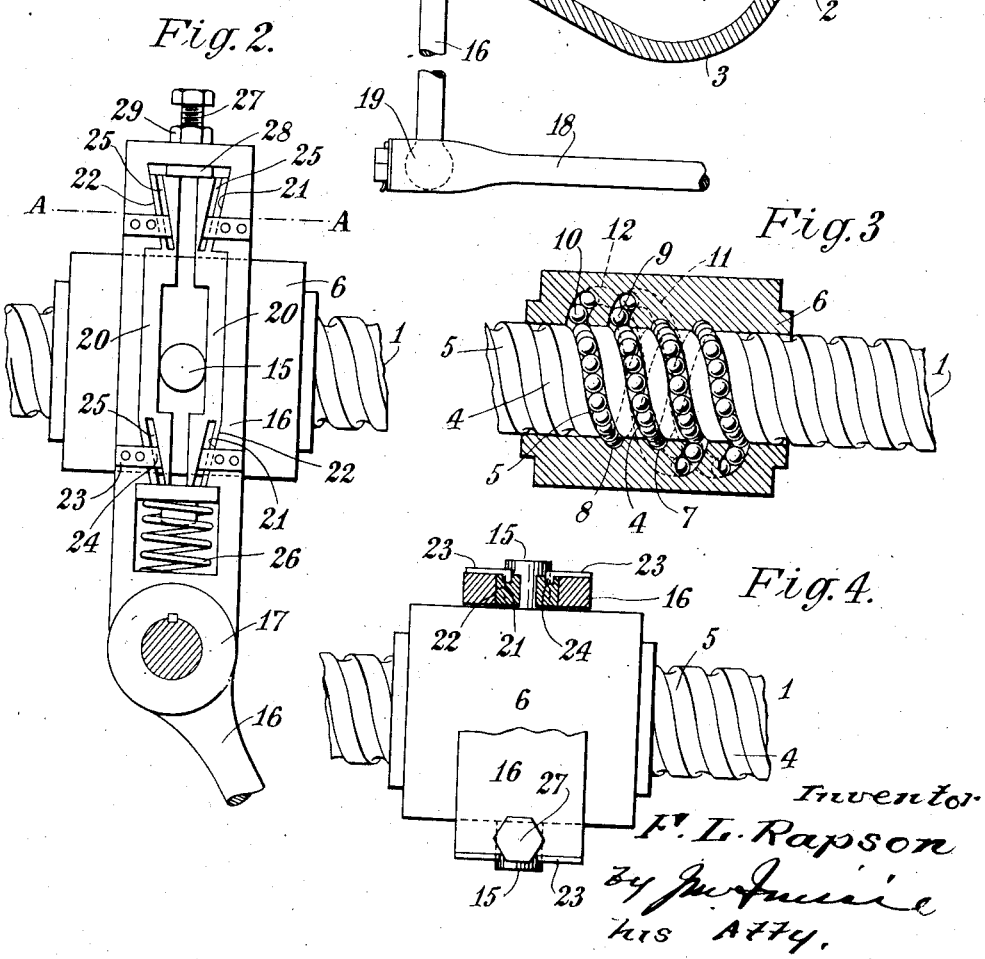
Inventor
F. L. Rapson
by [signature]
his Atty.

UNITED STATES PATENT OFFICE.

FREDERICK LIONEL RAPSON, OF LIVERPOOL, ENGLAND.

MEANS FOR STEERING MOTOR-VEHICLES.

1,343,846.

Specification of Letters Patent. Patented June 15, 1920.

Application filed October 16, 1918. Serial No. 258,427.

*To all whom it may concern:*

Be it known that I, FREDERICK LIONEL RAPSON, a subject of His Majesty the King of England, and resident of Liverpool, in the county of Lancaster, Kingdom of England, have invented certain new and useful Improvements in Means for Steering Motor-Vehicles, of which the following is a specification.

This invention relates to improvements in means for steering motor vehicles.

The invention has for its object to provide a device for steering automobiles with the minimum effort which device will be specially applicable to heavy vehicles such as lorries, steam wagons or tractors.

A further object is to provide a device which will be automatically self alining, or nearly so, by providing double compression springs which will always tend to keep in its normal or central position a block mounted on the steering pillar.

A further object is to eliminate the drawbacks of the usual worm and worm wheel steering, by providing simple means to take up the slack due to wear thereby preventing play in the steering wheel.

With these and other objects in view the invention consists in providing a device in which the steering mechanism is actuated by a block movable on an anti-friction thread, the block being disposed between compression springs which tend to keep the block in its normal position.

One form of the invention will now be described with reference to the accompanying drawings in which:—

Figure 1 is a sectional side elevation;

Fig. 2 is an enlarged detail of the lever member;

Fig. 3 is an enlarged section of the runner block and shaft, and,

Fig. 4 is a section on the line A—A of Fig. 2.

As shown the lower end of the preferably hollow steering pillar 1 which is provided at its upper end with a hand wheel and controls in the usual manner not shown, is mounted in a pair of anti-friction or ordinary bearings 2 provided in a suitable casing 3. The portion of the pillar shaft 1 disposed between the pair of bearings in the casing 3 is formed with two helical grooves 4 and 5 and upon this portion of the shaft 1 is mounted a block or nut 6 formed with coöperating helical grooves 7 and 8. Within these coöperating grooves 4 and 7 and 5 and 8 are provided a number of anti-friction rollers or balls 9 and 10 which are circulated through channels 11 and 12 cut in the said block 6, thus providing anti-friction threads which will enable the block 6 to be easily moved axially along the shaft 1 when turned by the hand or steering wheel. At each side of the said block 6 and surrounding the shaft 1 are disposed coiled compression springs 13 which act to keep the block 6 in its intermediate position. The outer ends of these springs 13 bear against the bearings 2 disposed in the casing 3. Suitable recesses 14 are cut in the bearings 2 and in the ends of the block 6 to receive the outer ends of the springs 13. Each side of the block 6 is provided with outwardly extending anti-friction rollers 15 which are adapted to move in the slotted ends of a lever member 16 fulcrumed at 17 in the lower portion of the inclosing casing 3. The outer and lower end of this lever 16 is connected to one end of a link 18 through the usual ball adjustment devices 19 and the end of the link 18 is connected to the usual "Ackermann" steering gear. The slotted ends of the lever 16 are provided with adjusting plates 20 to enable any play between the forked end of the lever 16 and the anti-friction rollers 15 to be taken up. The plates 20 are formed with inclined faces 21 which are adapted to coöperate with inclined faces 22 formed in the slotted ends of the lever member 16. The plates 20 are retained in position by angle members 23 which are secured to the lever 16. The inwardly turned ends 24 of the angle members 23 are adapted to engage in slots 25 cut in the said plates 20. The plates 20 are moved downwardly against the action of a spring 26 by a bolt 27 engaging on a washer 28 abutting on the upper ends of the plates 20. Thus any play between the plates 20 and the anti-friction rollers 15 can be taken up by adjusting the bolt 27 and be locked by the nut 29. The inclosing casing 3 is preferably provided with a detachable lid 30 to enable the parts to be lubricated and adjustments to be made. Suitable grease retaining washers or other suitable means may be provided in the base of the casing 3 to make a fluid tight joint at the fulcrum 17 of the lever member 16.

What I claim is:—

1. A steering device of the character described, comprising a rotatable post, a block to move longitudinally of the post and having screw threaded engagement therewith, yielding means disposed to engage the block to oppose its longitudinal movement in either direction, and means for connecting the block with the steering wheels of a vehicle.

2. A steering device of the character described, comprising a rotatable post, a block to move longitudinally of the post and having screw threaded engagement therewith, compressible coil springs surrounding the post and contacting with the opposite ends of the block to oppose its longitudinal movement in either direction, and a pivoted lever having connection with the block and adapted for connection with the steering wheels of the vehicle.

3. A steering device of the character described, comprising a rotatable post, a block having screw threaded engagement therewith and provided with a pivot element, a movable member, plates adjustably mounted in said member to receive the pivot element between them, and means for adjusting the plates with respect to the pivot elements to compensate for play in the operation of the parts.

4. A steering device of the character described, comprising a rotatable post, a block having screw threaded engagement therewith and provided with a pivot element, a pivoted member formed with a longitudinal opening, plates mounted in each opening and having their approximate edges spaced to receive the pivot elements between them, the ends of said plates and the adjacent portions of the pivoted member being formed with coöperating elements adapted in the longitudinal movement of the plates to adjust the relative spacing of the approximate edges of said plates, and means for adjusting said plates.

5. A steering device of the character described, comprising a rotatable post, a block having screw threaded engagement therewith and provided with a pivot element, a pivoted lever disposed near the block and having a longitudinal opening, the side walls of said longitudinal opening being provided near their ends with longitudinal inclined faces, plates arranged within the longitudinal opening upon opposite sides of the pivot element to contact therewith and having longitudinal inclined faces arranged near their ends to contact with the first named longitudinal inclined faces, a spring arranged near corresponding ends of the plates to oppose their longitudinal movement with relation to the lever, and an element having screw threaded engagement with the lever near the opposite ends of the plates and serving to move the plates longitudinally in one direction with relation to the lever.

6. A steering device comprising a casing, a threaded steering post mounted in the casing for rotation, a block encircling the post within the casing, said block having thread recesses and transferring channels between said recesses, anti-friction balls arranged in said recesses to engage the threads in the post, said ball being permitted necessary movement through said transferring channels, and springs encircling the post and bearing respectively between opposite sides of the block and the casing.

In testimony whereof I have hereunto signed my name.

FRED LIONEL RAPSON.